United States Patent [19]

Pridham

[11] Patent Number: 4,646,819

[45] Date of Patent: Mar. 3, 1987

[54] APPARATUS FOR DRYING AIR

[75] Inventor: Ronald G. Pridham, Downingtown, Pa.

[73] Assignee: Monsanto Company, St. Louis, Mo.

[21] Appl. No.: 764,236

[22] Filed: Aug. 9, 1985

[51] Int. Cl.⁴ ............................................. F25D 21/00
[52] U.S. Cl. ........................................ 165/111; 62/93;
62/272; 165/141; 165/159
[58] Field of Search ............... 165/111, 141, 155, 164,
165/113, 159, 160, 161; 62/90, 93, 272

[56] References Cited

U.S. PATENT DOCUMENTS

| 2,521,040 | 9/1950 | Casetta | 165/164 X |
| 3,488,677 | 1/1970 | Tracy et al. | 165/141 |
| 3,722,583 | 3/1973 | Fiedler | 165/176 X |
| 3,734,174 | 5/1973 | Bloxham et al. | 165/181 X |
| 3,744,459 | 7/1973 | Reed | 165/113 X |
| 3,797,565 | 3/1974 | Fernandes | 165/111 |
| 3,818,718 | 6/1974 | Freese | 62/90 X |
| 3,899,023 | 8/1975 | Zander et al. | 62/90 X |
| 4,027,729 | 6/1977 | Brühl | 165/111 |
| 4,193,443 | 3/1980 | Nanaumi et al. | 62/93 X |
| 4,242,110 | 12/1980 | Hynes | 62/90 X |
| 4,254,826 | 3/1981 | Adams | 165/155 X |
| 4,410,035 | 10/1983 | White | 165/111 |
| 4,440,217 | 4/1984 | Stieler | 165/145 X |
| 4,550,775 | 11/1985 | Edwards et al. | 165/111 |

FOREIGN PATENT DOCUMENTS

| 0002325 | 6/1979 | European Pat. Off. | 62/90 |
| 45-39597 | 12/1970 | Japan | 62/90 |

Primary Examiner—William R. Cline
Assistant Examiner—Randolph A. Smith
Attorney, Agent, or Firm—H. Croskell

[57] ABSTRACT

Air drying apparatus wherein input air to be dried is passed through an air tube which contains a smaller refrigerant tube, with precooled air from the air tube being forced by baffles to flow along a tortuous path over the exterior of the air tube. The baffles being truncated discs positioned in the shell so that alternating baffles have the truncations facing in opposite directions.

1 Claim, 4 Drawing Figures

APPARATUS FOR DRYING AIR

TECHNICAL FIELD

The present invention relates, in general, to gas drying and, in particular, to heat exchanging units which cool air to below its dew point temperature and remove the liquid which condenses at these lower temperatures to produce dry air. Although the invention will be described in connection with air drying, it will be apparent that it has broader application and may be employed to condition other gases.

BACKGROUND ART

A significant need for air drying systems is found in industrial and other facilities which channel compressed air to various locations in the facility. This compressed air is normally then expelled through hoses at individual stations to clean or operate machinery and the like.

An important problem with such a system is that the air being compressed contains water. Due to the pressure increase and temperature variations in the system, the compressed air may, on some days, be very moist and even have water droplets. This is undesirable or unacceptable in many situations.

To remove this undesirable moisture, air drying devices have, in the past, been incorporated into the compressed air lines between the compressor and the end use areas. Many types of air dryers have been made available commercially and are described in the literature. The designs of these units are based on a variety of different techniques.

One such technique which has received favorable acceptance employs "double dynamic" heat exchange. In systems which employ double dynamic heat exchange, input air which is to be cooled is placed in simultaneous heat exchange relationship with a refrigerant and the already cooled output air. The primary benefits of double dynamic heat exchange units are space savings and costs savings. U.S. Pat. No. 3,818,718 is an example of an air dryer employing double dynamic heat exchange.

In the past, heat exchange units have been arranged with one passageway surrounded by another passageway. One type of such device is generally known in the field as a "shell and tube device." These units have one or more central tubes which carry refrigerant and a larger diameter cylinder or shell positioned around the central tubes. The air to be chilled and dried is ducted between the outer shell and the inner central tubes.

Such shell and tube devices and, generally, single dynamic heat exchange units are larger and more costly than desired. Added space and components are required when the entire cooling effect is provided by the refrigerant or when the input air is first cooled by heat exchange with the output air and then by heat exchange with the refrigerant.

DISCLOSURE OF THE INVENTION

Accordingly, it is an objective of the present invention to provide a new and improved double dynamic heat exchange unit.

It is another objective of the present invention to provide a double dynamic heat exchange unit of the shell and tube type.

It is a further objective of the present invention to provide a double dynamic heat exchange unit which overcomes the shortcomings and limitations of comparable prior art units.

It is yet another objective of the present invention to provide a double dynamic heat exchange unit which satisfies concurrently the requirements of efficient and reliable operation and reasonable cost.

These and other objectives are achieved by a double dynamic heat exchange unit which is constructed in accordance with the present invention and includes a plurality of refrigerant passageways adapted to carry a refrigerant. Also included is a plurality of input gas passageways individually surrounding the refrigerant passageways and adapted to carry an input gas to be conditioned from an input point to an output point in heat exchange contact with the refrigerant. The heat exchange unit of the present invention further includes an output gas passageway surrounding the input gas passageways and adapted to carry an output conditioned gas from an input point to an output point in heat exchange contact with the input gas simultaneously with the heat exchange contact between the input gas and the refrigerant. Also included are means within the output gas passageway for forming a tortuous path for flow of the output gas from the input point of the output gas to the output point of the output gas. A separator is connected between the output point of the input gas and the input point of the output gas.

BRIEF DESCRIPTION OF THE DRAWINGS

Referring to the drawings

BEST MODE OF CARRYING OUT THE INVENTION

Figure 1:
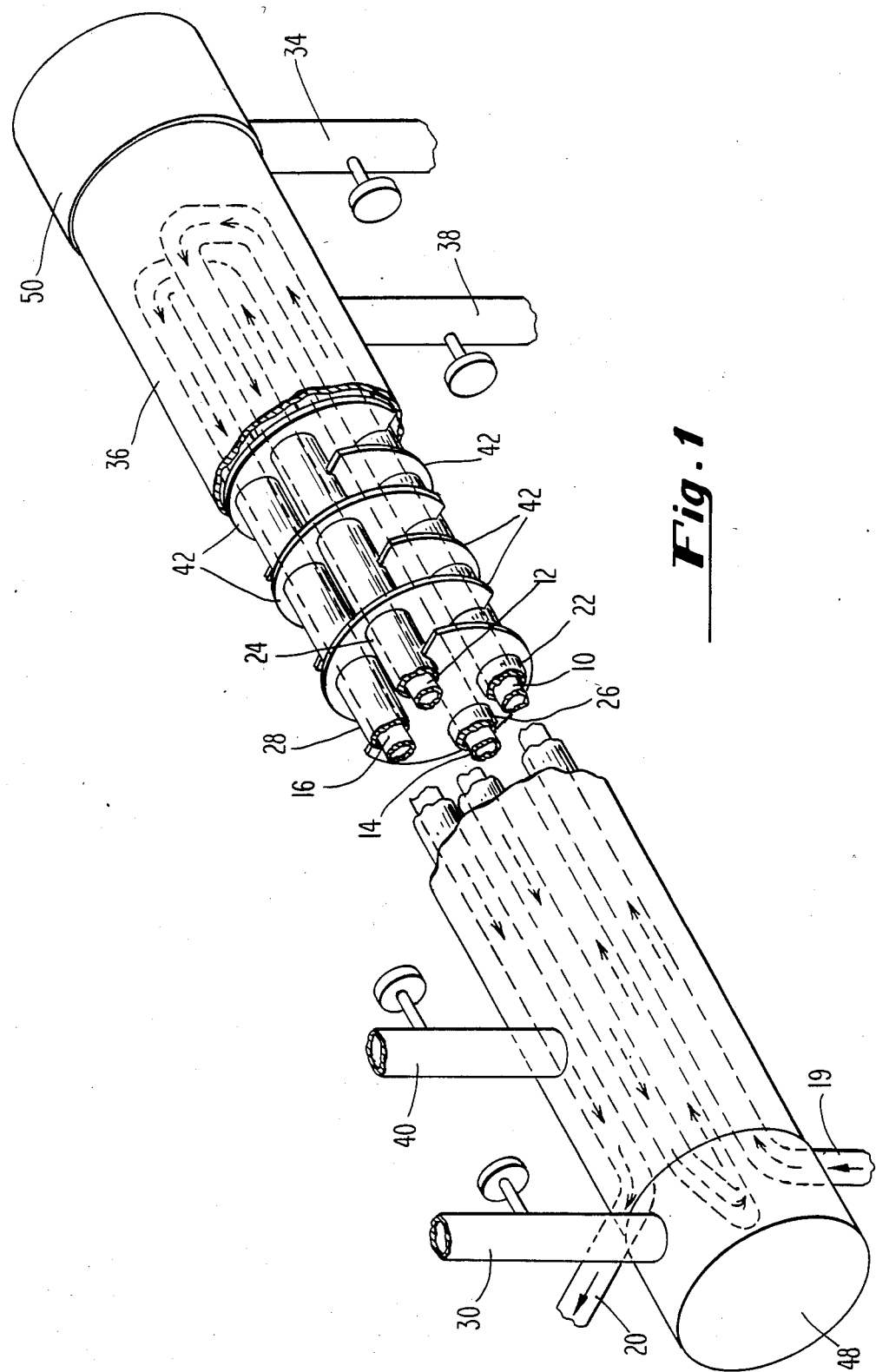
FIG. 1 is a perspective view, partially broken away, of a preferred embodiment of a heat exchange unit constructed in accordance with the present invention.
Figure 2:
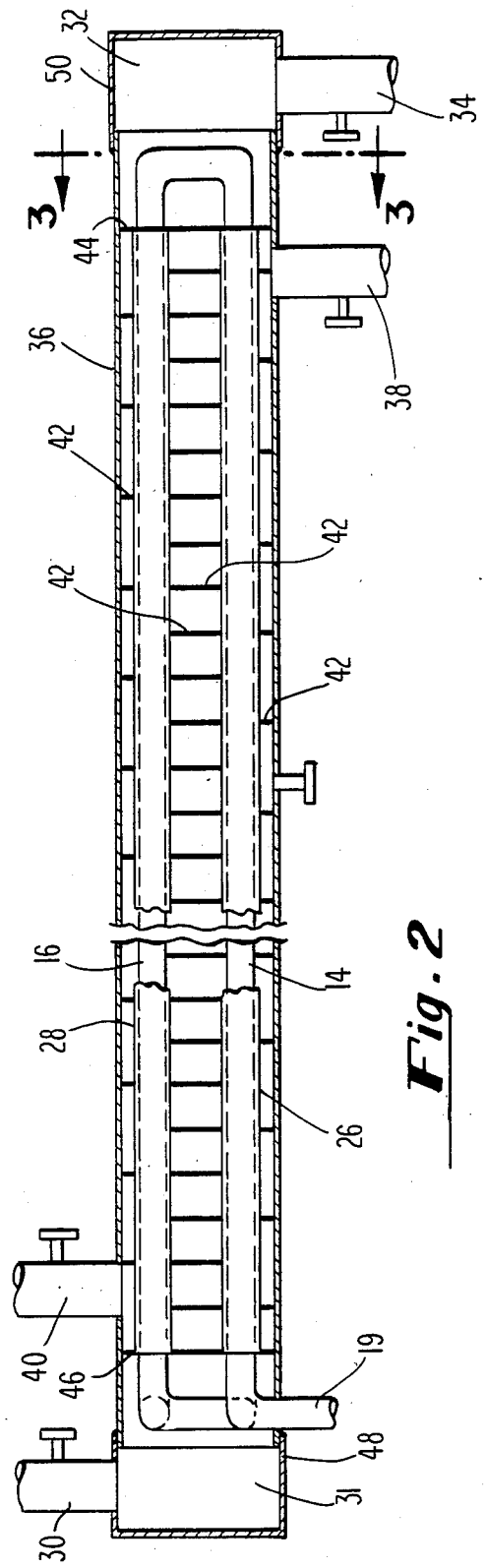
FIG. 2 is a vertical section along the length of the heat exchange unit of FIG. 1.
Figure 3:
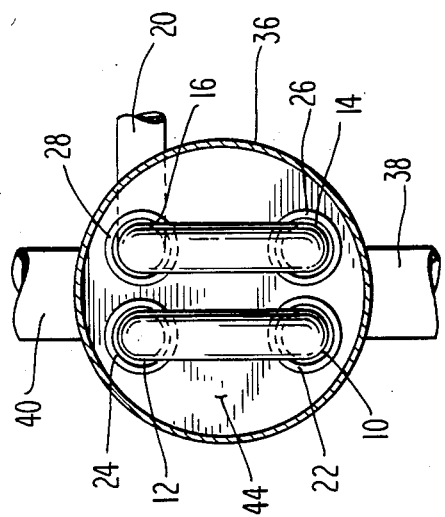
FIG. 3 is a vertical section taken along line 3—3 of FIG. 2.
Figure 4:
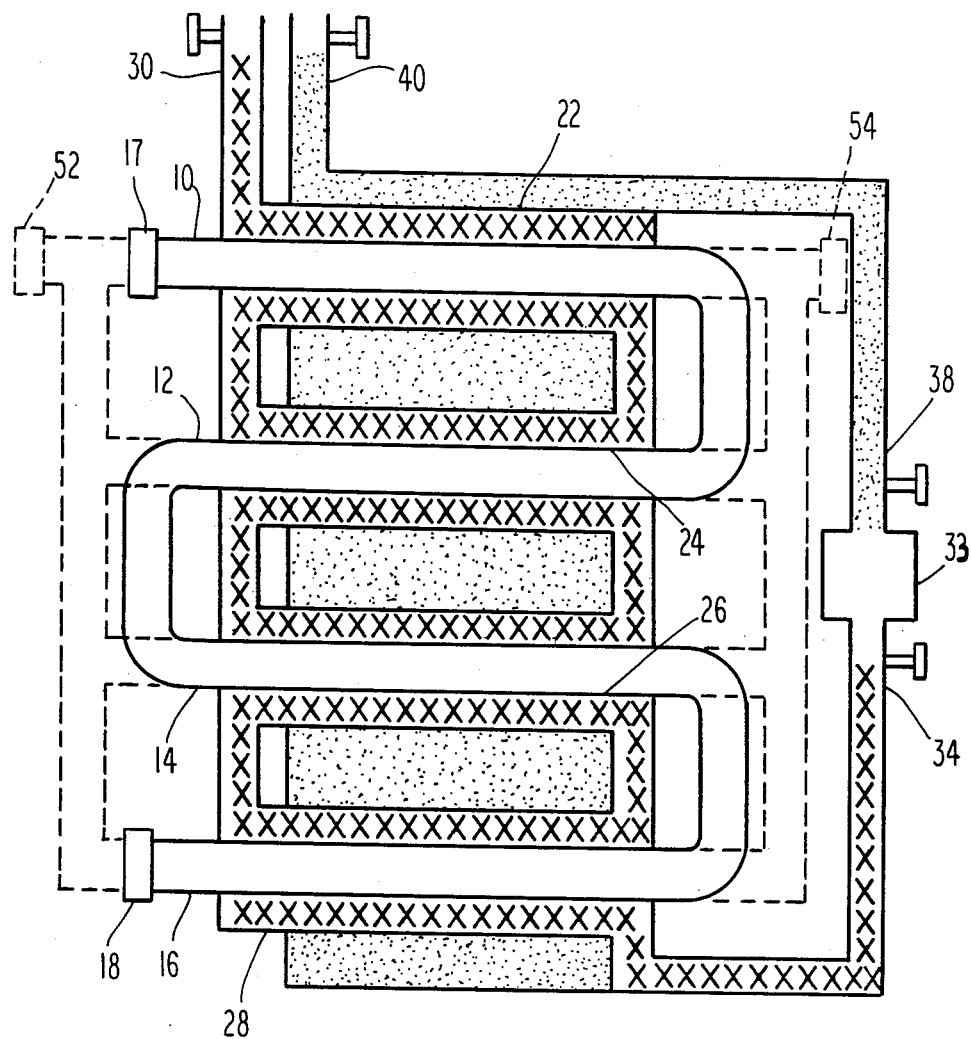
FIG. 4 is a schematic diagram which illustrates the heat exchange relationship of the input gas, the output gas and refrigerant carried in the heat exchange unit of FIG. 1.

Referring to the drawings, a heat exchange unit, constructed in accordance with the present invention, includes a plurality of refrigerant passageways 10, 12, 14 and 16 each adapted to carry a refrigerant. For the embodiment of the invention shown in FIGS. 1, 2 and 3 and in solid lines in the schematic diagram of FIG. 4, the refrigerant passageways are connected in series to form a tube which makes four passes along the length of the heat exchange unit. Suitable fixtures, represented by reference numerals 17 and 18 in FIG. 4, serve to connect opposite ends 19 and 20, shown in FIGS. 1, 2 and 3, of the series-connected refrigerant passageways to a refrigerant source.

A plurality of input gas passageways 22, 24, 26, and 28 individually surround refrigerant passageways 10, 12, 14 and 16, respectively. Input gas passageways 22, 24, 26 and 28, in the form of tubes which are concentric with their associated refrigerant passageways, carry an input gas to be conditioned in heat exchange contact with the refrigerant carried by the refrigerant passageways. Tubes 22, 24, 26 and 28 receive input air supplied from a source through a valved inlet 30 and a header 31. The input air enters the ends of tubes 22, 24, 26, and 28 which open into header 31 and flows from this input point through the four parallel passageways to an output point at the opposite ends of these tubes which open into a header 32 The input air, cooled by the refrigerant carried in passageways 10, 12, 14 and 16, is supplied to a separator 33 through header 32 and a valved outlet 34.

An elongated shell 36, forming an output gas passageway, surrounds the four input air tubes 22, 24, 26, and 28 which extend parallel to the longitudinal axis of the shell. Air supplied to separator 33 is returned to an input point in shell 36 through a valved inlet 38. The output air flows along the length of shell 36 to an output point in heat exchange contact with the input air simultaneously with the heat exchange contact between the input air and the refrigerant. Conditioned output air is supplied to a utilization system from the output point through a valved outlet 40.

Positioned within shell 36 and extending inward from the inside surface of the shell is a plurality of baffles 42 which form a tortuous path for flow of the output air along the length of the shell. Baffles 42 are thin plate members and, with shell 36 being cylindrical, the baffles are generally semicircular in shape, conforming to the inside surface of shell 36. When the shell is in the form of a cylinder, the baffles are in the form of truncated discs. The baffles have an angular extent of approximatley 300°. Alternate baffles 42 are disposed in opposite directions perpendicular to the axis of shell 36. With this baffle arrangment, the concentric tube pairs 10 and 22, 12 and 24, 14 and 26, and 16 and 28 extend through baffles 42 and also end walls 44 and 46 which close off the ends of shell 36 at the input and output points of the output gas, respectively.

Headers 31 and 32 are formed by a pair of caps 48 and 50, respectively, which are fitted over and attached to extensions of shell 36.

Baffles 42 reduce the cross-sectional area of shell 36 and form a tortuous path for output air flow. The flow of output air is generally helical. This produces an increase in the speed of the output air which, in turn, increases the heat transfer rate between input air and output air. This, in turn, permits reducing the size of the overall heat exchange unit. Although the output air moves at a higher speed because of the baffle arrangement, it remains in heat exchange contact with the input air for a longer period of time because its path is helical.

Refrigerant passageways 10, 12, 14, and 16 can be connected in parallel instead of in series. This alternative arrangement is shown by the dashed lines in FIG. 4. Opposite ends of each refrigerant passageway are adapted for connection to the refrigerant source by means of suitable fixtures represented by reference numerals 52 and 54. It is also possible to connect the refrigerant passageways in a combination parallel and series arrangement. The particular selection of connection of the refrigerant passageways is dependent upon the particular design chosen for the heat exchange unit. Generally, a series connection produces better results for a lower number of passes along the length of the heat exchange unit, while a parallel connection produces better performance for a higher number of passes.

The foregoing has set forth exemplary and preferred embodiments of the present invention. It will be understood, however, that various alternatives will occur to those of ordinary skill in the art without departure from the spirit and scope of the present invention.

What is claimed is:

1. A heat exchange unit comprising:
   a. an elongated shell;
   b. a pair of tube sheets positioned in the shell adjacent to the ends thereof;
   c. a pair of caps secured to the ends of the shell to form headers at each end of the shell;
   d. a plurality of air carrying tubes positioned in the shell and extending through the tube sheets into the headers;
   e. a plurality of refrigerant carrying tubes connected in series, said refrigerant carrying tubes having a smaller diameter than said air carrying tubes, said refrigerant carrying tubes being positioned inside the air carrying tubes; and
   f. a plurality of baffles positioned in the shell for forming a tortuous path for the flow of air exiting from the air carrying tubes, said baffles being in the form of truncated discs, said baffles being so positioned in the shell that alternating baffles have the truncations facing in opposite directions.

* * * * *